United States Patent
Lin et al.

(10) Patent No.: US 9,423,098 B2
(45) Date of Patent: Aug. 23, 2016

(54) LENS AND LIGHTING DEVICE

(71) Applicant: OSRAM GmbH, Munich (DE)

(72) Inventors: Jing Lin, Shenzhen (CN); Dirk Buchhauser, Shenzhen (CN); HongWei Zhang, Shenzhen (CN); Tingbiao Lan, Shenzhen (CN); Jin Hu, Shenzhen (CN); Gengjun Pan, Shenzhen (CN)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 14/435,755

(22) PCT Filed: Oct. 16, 2013

(86) PCT No.: PCT/EP2013/071656
§ 371 (c)(1),
(2) Date: Apr. 15, 2015

(87) PCT Pub. No.: WO2014/060491
PCT Pub. Date: Apr. 24, 2014

(65) Prior Publication Data
US 2015/0260369 A1    Sep. 17, 2015

(30) Foreign Application Priority Data
Oct. 16, 2012  (CN) .................... 2012 2 0529257 U

(51) Int. Cl.
*F21V 5/04*  (2006.01)
*F21V 5/08*  (2006.01)
*G02B 19/00*  (2006.01)
*F21V 5/00*  (2015.01)
*F21V 7/00*  (2006.01)
*F21K 99/00*  (2016.01)
*F21Y 101/02*  (2006.01)

(52) U.S. Cl.
CPC . *F21V 5/08* (2013.01); *F21K 9/30* (2013.01); *F21V 5/00* (2013.01); *F21V 5/045* (2013.01); *F21V 7/0091* (2013.01); *G02B 19/0028* (2013.01); *G02B 19/0061* (2013.01); *G02B 19/0071* (2013.01); *F21Y 2101/02* (2013.01)

(58) Field of Classification Search
CPC .......... F21V 7/06; F21V 7/08; F21V 7/0091; F21V 5/00; F21V 5/04; F21V 5/045; F21V 5/046; F21V 5/08; F21K 99/00; G02B 19/0071; G02B 19/0061; G02B 19/0028
See application file for complete search history.

(56) References Cited

U.S. PATENT DOCUMENTS

| 8,591,083 B2* | 11/2013 | Koizumi et al. | B60Q 1/302 362/545 |
| 2007/0159831 A1* | 7/2007 | Faller | F21K 9/00 362/311.02 |

* cited by examiner

*Primary Examiner* — Y M. Lee
(74) *Attorney, Agent, or Firm* — Viering, Jentschura & Partner mbB

(57) ABSTRACT

Various embodiments may relate to a lens for a lighting assembly. The lens includes a bottom surface and an outer surface extending upwardly from the bottom surface, wherein the bottom surface includes an incident surface and the outer surface includes emergent surfaces, wherein the outer surface includes at least one first surface unit that includes a light adjusting surface and an emergent surface, the light adjusting surface receives at least one part of light beams from the incident surface and adjusts the light beams to the emergent surface to emerge through the emergent surface, and emergent light beams are converged at focus.

18 Claims, 6 Drawing Sheets ns and Lighting Device

LENS AND LIGHTING DEVICE

RELATED APPLICATIONS

The present application is a national stage entry according to 35 U.S.C. §371 of PCT application No.: PCT/EP2013/071656 filed on Oct. 16, 2013, which claims priority from Chinese application No.: 201220529257.2 filed on Oct. 16, 2012, and is incorporated herein by reference in its entirety.

TECHNICAL FIELD

Various embodiments may relate to a lens and a lighting device.

BACKGROUND

In the illumination field, the lens is popular and widely used. Inmost cases, uniform light is used for illumination, but in some particular situations, people would like to see sparkling points or flickering points for sight attraction. For instance, decorative lamps or crystal lamps are used for realizing sparkling effect.

Some solutions are also put forward in the related art to endow an illuminating device with sparkling effect, for instance, it is not realized via a lens, for example, it is provided in the related art that some sparkling light sources can be assembled together to jointly realize the sparkling effect.

SUMMARY

Various embodiments provide a lens and a lighting device that can provide emergent-light illumination with sparkling points and have advantages such as high luminous efficiency.

A lens for a lighting assembly is provided according to various embodiments. The lens includes a bottom surface and an outer surface extending upwardly from the bottom surface, wherein the bottom surface includes an incident surface, characterized in that the outer surface includes at least one first surface unit that includes a light adjusting surface and an emergent surface, the light adjusting surface receives at least one part of light beams from the incident surface and adjusts the light beams to the emergent surface to emerge through the emergent surface, and emergent light beams are converged at focus. The emergent surfaces of the present disclosure are correspondingly configured according to different incident light, directions of the incident light are adjusted by the light adjusting surface to finally format least one group of emergent light beams converged at corresponding focus after passing through the emergent surfaces. Since the emergent light beams are converged at the focus, respectively, sparkling points are formed at the focus. Images of these sparkling points on retina of a person are point images, therefore, it is brighter or more sparkling for human eyes. As a result, light-emergent effect with sparkling points is created on the whole.

According to various embodiments, the light adjusting surface adjusts light beams from the incident surface to light beams to be converged at the focus. At this time, the light adjusting surface mainly serves the function of converging light beams. In this situation, the emergent surfaces substantially make no contribution to converging light beams to the focus, and merely have the function of emerging light.

According to various embodiments, the light adjusting surface is a total internal reflection surface. As the light adjusting surface itself is configured as a total internal reflection surface, there is substantially no light loss, so that the luminous efficiency is improved.

Further, the total internal reflection surface is configured as an elliptic curved surface. In cases of elliptic curved surface, the incident light passes through a first focus of ellipse, and then, the elliptic curved surface reflects the incident light into light beams emerging through a second focus, wherein the second focus is just a sparkling point.

As an alternative embodiment of the elliptic curved surface, the total internal reflection surface is configured as a parabolic curved surface. In cases of parabolic curved surface, the incident light can be adjusted to be incident parallelly, and then, the parabolic curved surface reflects the incident light into light beams emerging through a focus of the parabolic curved surface, wherein the focus of the parabolic curved surface is just a sparkling point.

As an alternative embodiment of the elliptic curved surface and the parabolic curved surface, if the incident light is light between light of a point light source and parallel light, correspondingly, the total internal reflection surface is configured as a curved surface changing between the parabolic curved surface and the elliptic curved surface. Upon adjustment of the curved surface, it is finally realized that emergent light beams are also focused on positions of the focuses. The focuses are just sparkling points.

According to various embodiments, the first surface unit includes a first surface and a second surface, and any one surface of the first surface and the second surface is used as the light adjusting surface to adjust light beams from the incident surface to the other surface of the first surface and the second surface used as the emergent surface to emerge through the other surface. At this time, the first surface and the second surface are adjusting surfaces, and both the first surface and the second surface are emergent surfaces. Any one surface of the first surface and the second surface simultaneously serves two functions, namely, function of reflecting light incident thereon, and allowing light adjusted by the other surface to emerge therefrom. The first surface is the emergent surface, and the corresponding light adjusting surface is the second surface; and the second surface is the emergent surface, and the corresponding light adjusting surface is the first surface. Therefore, the configuration is compact and the luminous efficiency is high.

In various embodiments, all light beams emerging through the first surface are converged at a first focus, and all light beams emerging through the second surface are converged at a second focus. As a result, sparkling points corresponding to the first surface and the second surface are realized, respectively.

In various embodiments, the first surface and the second surface are gathered together on top and form a ridge protrusion. The two are allowed to be configured to be closer in distance to reduce an optical distance and further reduce light loss; moreover, it is favorable for the two to be used as the emergent surface and the light adjusting surface to each other. In addition, it has the advantage of facilitating the manufacture process.

In various embodiments, the first surface unit is in a number of at least two, and the first surface units are arranged rotation symmetrically in relation to a central line of the lens. Therefore, uniform and symmetric distribution of the sparkling points is realized while the sparkling points are further increased.

In various embodiments, the emergent surface further includes second surface units that receive a part of light beams from the incident surface and adjust the light beams into light beams emerging at least in lateral directions. The function of the second surface units lies in assuring illumination in lateral directions.

In various embodiments, the second surface units further adjust the light beams into emergent light beams at least pointing downward. The function of the second surface units lies in assuring illumination in a downward direction.

In various embodiments, the second surface units include a plurality of emergent surfaces arranged in sequence from top to bottom, and lateral light beams created by the emergent surfaces are reduced gradually from top to bottom, and downward light beams created are increased gradually. As a result, the second surface units closer to the bottom are allowed to be responsible for illumination in the downward direction.

In various embodiments, respective emergent surface has a gradient gradually increasing from top to bottom in relation to a horizontal surface.

In various embodiments, the second surface units form a plurality of convexes laterally protruding, each convex is defined by two surfaces, and at least one surface of the two surfaces, closer to top, is used as the emergent surface. A specific shape of respective convex is defined by taking into consideration the lateral and/or downward light distribution.

In various embodiments, the first surface units are formed in center of the outer surface and arranged at both sides of a central symmetric line of the outer surface, and the second surface units are formed at periphery of the first surface units. Accordingly, it is convenient to focus the sparkling points mainly in the center, and good illumination is created, as much as possible, also in lateral peripheral direction.

In various embodiments, the outer surface extends in a three-dimensional space ranging 0°-180°.

In various embodiments, the lens is made from a polymer or a glass. The polymer is, e.g., PC material.

In various embodiments, the incident surface is a hemispherical curved surface. Thus, light is enabled to strike the lens perpendicularly to reduce the light loss as much as possible.

In various embodiments, the first surface unit and the second surface units are configured to jointly create candle-shape emergent light beams.

Various embodiments further relate to a lighting device including the above lens. In various embodiments, the lighting device further includes a circuit board and LED chips arranged on the circuit board, and the LED chips are arranged in center of a cavity defined by the incident surface.

The lens according to various embodiments may provide emergent-light illumination with sparkling points and have advantages such as high luminous efficiency.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

In the following detailed description, reference is made to the accompanying drawings, which form a part hereof, and in which is shown by way of illustration specific embodiments in which the invention may be practiced. In this regard, directional terminology, such as "top", "bottom", "front", "back", "leading", "trailing", is used in reference to the orientation of the figures being described. Because components of embodiments of the present invention can be positioned in a number of different orientations, the directional terminology is used for purposes of illustration and is in no way limiting. It is to be understood that other embodiments may be utilized and structural or logical changes may made without departing from the scope of the present invention. The following detailed description, therefore, is not to be taken in a limiting sense, and the scope of the present invention is defined by the appended claims.

Figure 1:
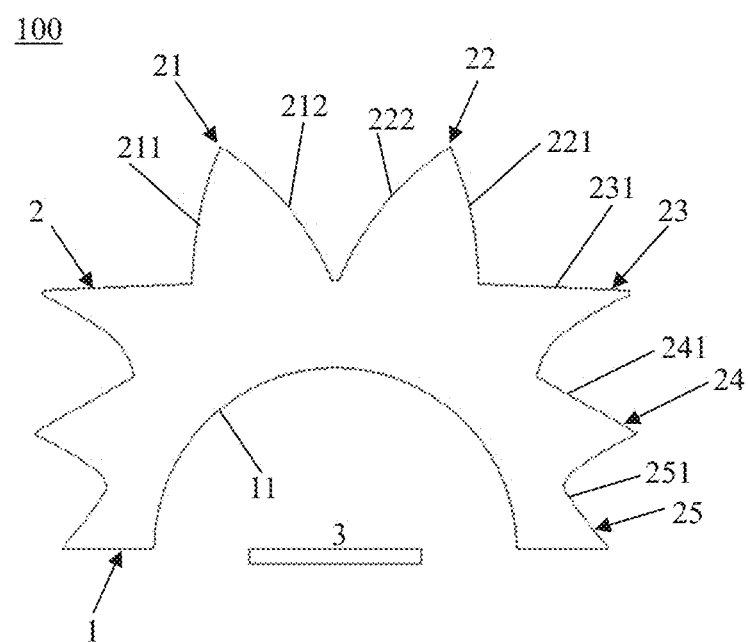
FIG. 1 is a front view of a first embodiment of a lens according to the present disclosure.
Figure 2:
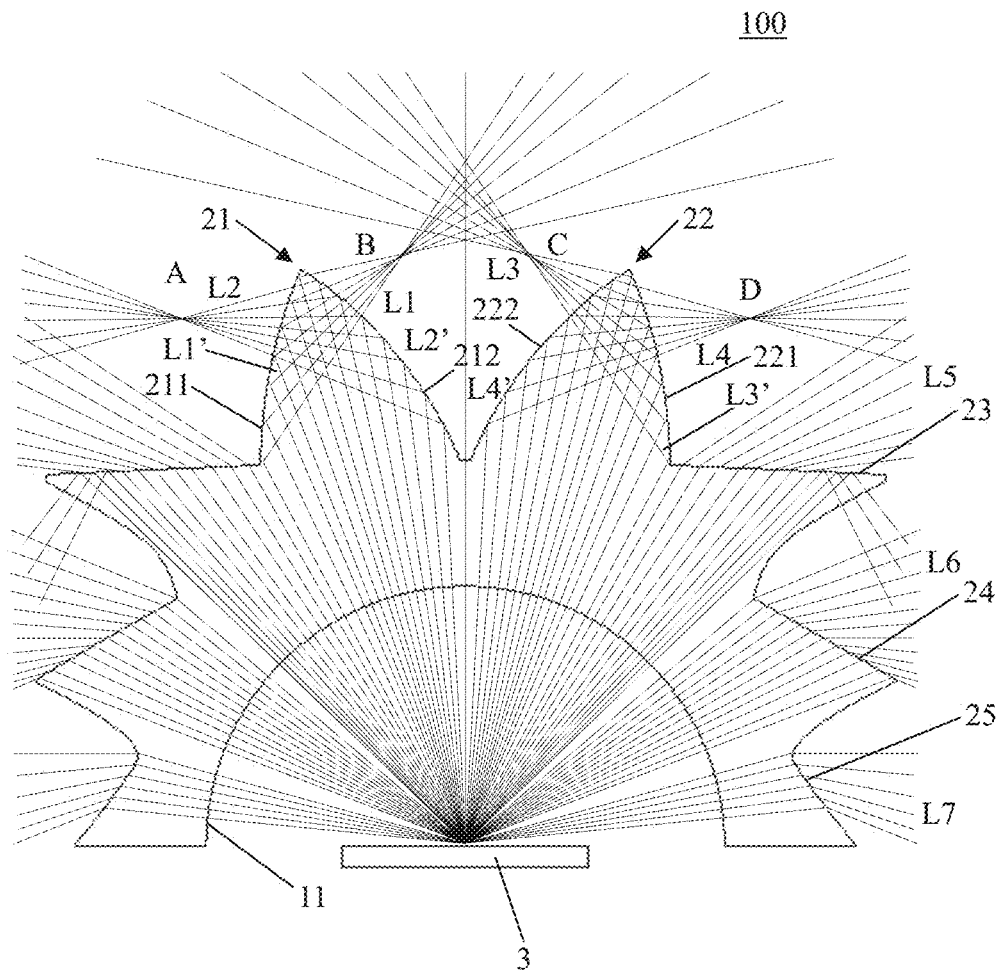
FIG. 2 shows an optical pathway diagram of the lens in FIG. 1.

FIG. 1 is a front view of a first embodiment of a lens according to the present invention; and FIG. 2 shows an optical pathway diagram of the lens in FIG. 1.

A lens 100 is configured for a lighting assembly to adjust light distribution of light emitted from a light source 3 of the lighting assembly so as to form expected light distribution. The lens according to the present invention is mainly used for creating sparkling points so as to achieve the effect of sparkling points existing in a lamp, particularly suitable for realizing effect of sparkling points in an LED lamp. According to the present invention, such effect is realized via a special lens.

The principle of the lens lies in realizing the sparkling points using focus of light beams. Therefore, it is provided that emitted light beams are enabled to form a plurality of focus, and the effect of sparkling points is realized using different visual effects formed by focus and light beams of regional illumination on retina of a person.

As shown in FIG. 1 and FIG. 2, the lens 100 comprises a bottom surface 1 and an outer surface 2, wherein the bottom surface 1 comprises an incident surface 11 and the outer surface 2 comprises emergent surfaces. The incident surface herein defines an accommodation cavity, and is a curved surface receiving incident light. The outer surface 2 herein defines a top of the lens and an outer profile of a side surface from the top to the bottom surface 1. According to the present invention, the outer surface 2 is specially configured, wherein the outer surface comprises at least one first surface unit 21, 22.

In the present embodiment, the whole outer surface of the lens 100 forms a plurality of protrusions 21-25 from the top down to the bottom. In the above, the first surface unit 21 and the first surface unit 22 for creating focus A-D, in other words, sparkling points, are substantially formed on the top, arranged symmetrically on both sides of a centrosymmetric line of the lens, and form ridge protrusions. Second surface units 23, 24, 25 behind the first surface unit 21 and the first surface unit 22 in a direction from the top to the bottom are configured to receive a part of light beams from the incident surface 11 and to adjust the light beams into light beams emerging at least in lateral directions and downwardly, so as to assure lateral and downward illumination while the sparkling points are provided. "Downward" in the text refers to a direction extending downwardly beyond the bottom surface in the figure.

In the embodiment as shown in FIG. 1 and FIG. 2, there are two first surface units. The number of the first surface also can be designed to be other than two, e.g. one or more, according to selection. Take the first surface unit 21 as an example to introduce the first surface unit. The first surface unit 21 comprises a first surface 211 and a second surface 212 arranged opposite to each other and both used use light emergent surfaces, through which, emergent light beams L1-L4 converged at the focus A, B, C and D are formed (see FIG. 2). In the present embodiment, both the first surface 211 and the second surface 212 are used as light emergent surfaces, that is, for first emergent light beams L1, the emergent surface is the second surface 212, and the light adjusting surface is the first surface 211, the first surface 211 adjusts first incident light beams L1' into focus light beams that then directly emerge through the second surface 212. And for second emergent light beams L2, the emergent surface is the first surface 211, and the light adjusting surface is the second surface 212, the second surface 212 adjusts second incident light beams L2' into focus light beams that then directly emerge through the first surface 211. Therefore, in the present embodiment, each of the first surface 211 and the second surface 212 is used as an emergent surface of a corresponding part of light beams, and a light adjusting surface of the other surface of the first surface 211 and the second surface 212. The other first surface unit 22 is configured in the same way as the first surface unit 21, and unnecessary details will not be given herein.

Of course, in other embodiments not shown, each of the first surface 211 and the second surface 212 also can be configured not to simultaneously serve functions of emergent surface and light adjusting surface, while one surface thereof is merely used as an emergent surface, and the other one is merely used as a light adjusting surface.

As shown in FIG. 1 and FIG. 2, the lens is configured to be rotationally symmetric, and the first surface units 21, 22 are located on both sides of a central axis of the lens. The first surface unit is formed in a top area of the outer surface 2 of the whole lens. Therefore, the sparkling points are mainly formed in the top area.

Reference is made to FIG. 2, in which an optical pathway diagram of the lens in FIG. 1 is shown, wherein optical pathways are shown. As shown in FIG. 2, the incident surface 11 is a hemispherical curved surface, and light from the light source 3 is incident perpendicularly upon the hemispherical curved surface and transmits in the whole lens to respectively strike the plurality of protrusions 21-25 formed in sequence from the top up to the bottom. Firstly, let's see the light beams incident on the first surface unit 21. The first incident light beams L1' are incident on the first surface 211, at which time, the first surface 211 as a light adjusting surface is configured as a total internal reflection surface, and a profile of the light adjusting surface is so configured that the incident light beams L1' just incident thereon strike the second surface 212 as light beams to be converged, and after passing through the second surface 212, they are finally converged at B point. Likewise, the second incident light beams L2' are incident on the second surface 212, at which time, the second surface 212 as a light adjusting surface is configured as a total internal reflection surface, and a profile of the light adjusting surface is so configured that the second incident light beams L2' just incident thereon strike the first surface 211 as light beams to be converged, at this time, the first surface 211 enables the light beams to emerge therethrough and the optical pathways at the same time are not affected, after passing through the first surface 211, they are finally converged at A point. It should be indicated that in the present embodiment, light emergent directions are not affected when the first surface 211 and the second surface 212 are used as emergent surfaces, while the first surface 211 and the second surface 212 also can be configured to affect the light emergent directions, but not to affect the light converging tendency, i.e. not to affect formation of the focus as sparkling points.

In a similar way, third incident light beams L3' are incident on the first surface 221 of the other first surface unit 22, and the third incident light beams L3', after adjusted by the first surface 221 into focus light beams, directly emerge through the second surface 222 to form the focus C, and fourth light incident beam L4' are incident on the second surface 222 of the other first surface unit 22, and the fourth light incident beam L4', after adjusted by the second surface 222 into focus light beams, directly emerge through the first surface 221 to form the focus D. The focus B and C and the focus A and D do not have the same height. The height positions and distances to the central symmetric line of the four focus also can be configured to be different.

The above is merely focus viewed in the front view. It can be imagined that each focus is reflected three-dimensionally as a plurality of sparkling points in a three-dimension direction of the lens, and different focus A-D assure that the lens has many different sparkling points at different heights and different distances from the central symmetric line. In order to form expected distribution of the sparkling points, positions and profiles of the light adjusting surface and the emergent surface can be arbitrarily adjusted to form different expected focus.

The above emergent light beams L1 and L3 converge after passing through the focus to provide illumination in center. The emergent light beams L2 and L4 transmit to both sides after passing through the focus to simultaneously provide illumination at both sides.

Let's see light beams incident on the second surface units 23, 24, 25. The second surface units are also symmetrically distributed, and they are distributed between the top and the bottom surface from top to bottom. As shown in the figure, the second surface units comprise a plurality of convexes, all of which can serve the function of simultaneously lighting laterally and downwardly. The difference is that lateral light created by these convexes from top to bottom decreases progressively, and the light created downward increases progressively. Specifically, the emergent surfaces from top to bottom have an increasing gradient in relation to the horizontal surface. The second surface units 23, 24, 25 form a plurality of protruding profiles laterally protruding, and each profile is defined by two surfaces, at least one surface 231, 241, 251 of the two surfaces, close to the top, is used as an emergent surface for adjusting the light beams into light beams L5-L7 emerging at least laterally and downwardly.

Figure 3A:
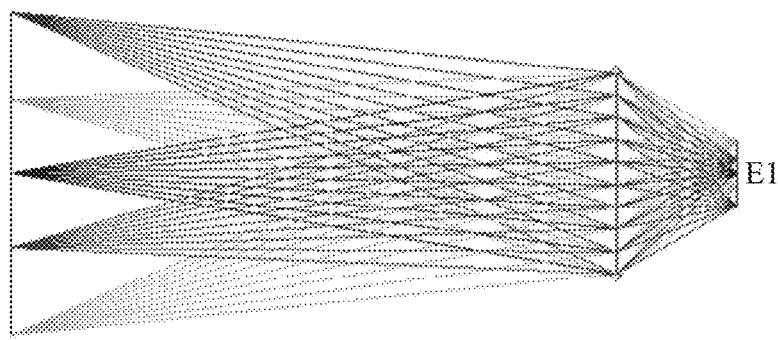
FIGS. 3A to 3C explain generation of sparkling effect by focus of the lens according to the present disclosure.
Figure 3B:
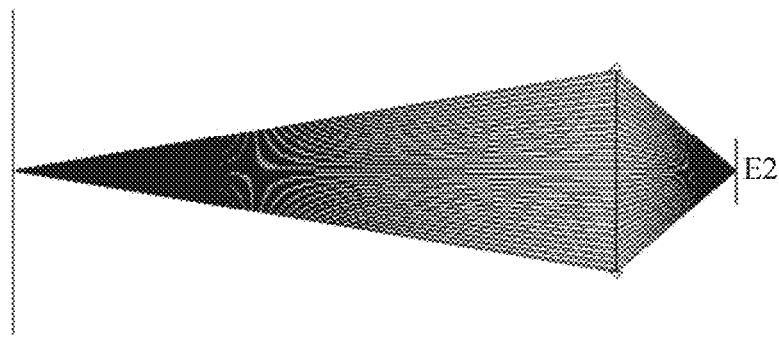
Figure 3C:
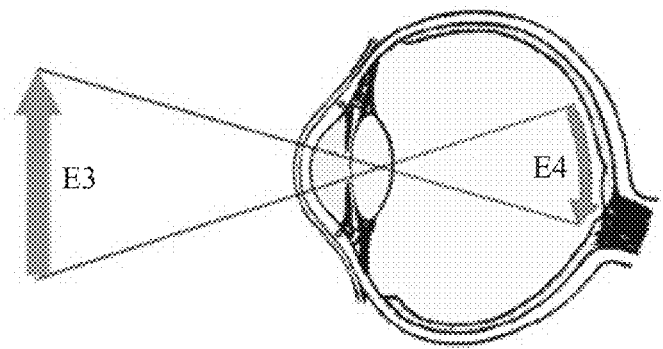

FIGS. 3A to 3C explain generation of sparkling effect by focus of the lens according to the present invention. It can be seen from FIG. 3C that an image E3 incident into eyes is usually imaged as E4 on retina of human eyes. Since it is a regional image E1 in FIG. 3A and it is a point image E2 in FIG. 3B, according to FIG. 3C, the corresponding point image on the retina seems to be brighter and forms a sparkling point. Therefore, the sparkling point effect is created as the focus in the text form the point images.

Figure 4:
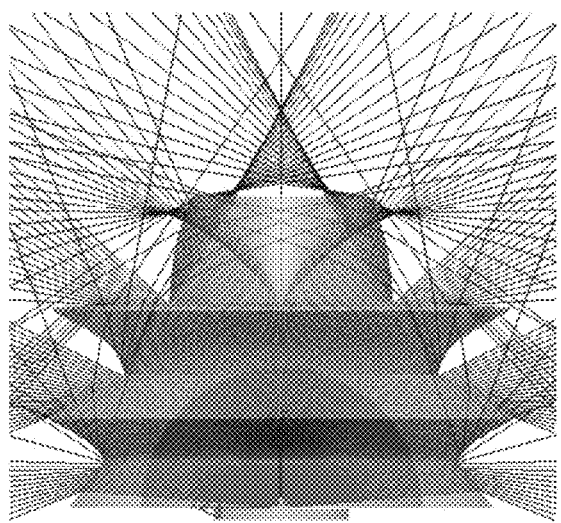
FIG. 4 is a 3D optical pathway diagram of the first embodiment of the lens according to the present disclosure.

FIG. 4 is a 3D optical pathway diagram of the first embodiment of the lens according to the present invention. It can be seen therefrom that lateral and downward illumination is realized while the sparkling points are formed in the present invention.

Figure 5:
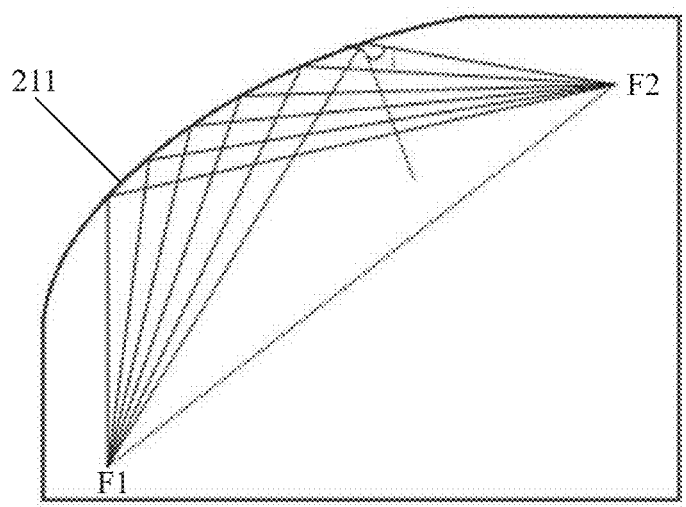
FIG. 5 is a schematic diagram of a first embodiment of an emergent surface (light adjusting surface) of the lens according to the present disclosure.

FIG. 5 is a schematic diagram of a first embodiment of the emergent surface (light adjusting surface) of the lens according to the present invention. The light adjusting surfaces 211,212,221,222 (only 221 are indicated in drawing) themselves are configured as total internal reflection surfaces, and therefore substantially there is no light loss, so that the luminous efficiency is improved. Respective total internal reflection surface is an elliptic curved surface. In cases of elliptic curved surface, the incident light passes through a first focus F1 of ellipse, and then, the elliptic curved surface reflects the incident light into light beams emerging through a second focus F2, wherein the second focus is just a sparkling point.

Figure 6:
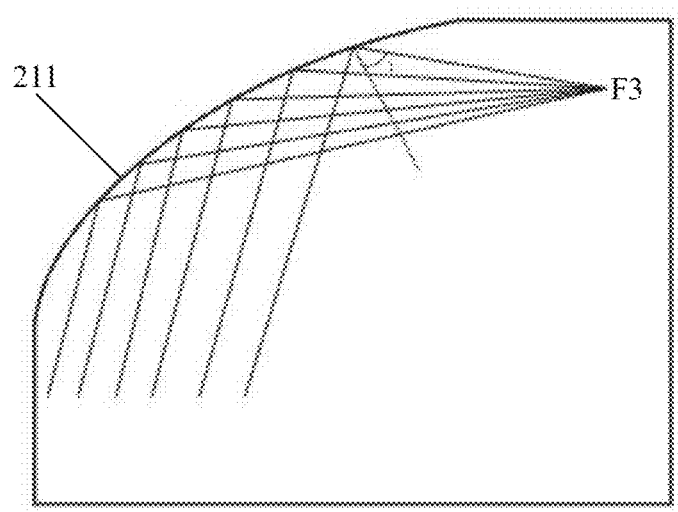
FIG. 6 is a schematic diagram of a second embodiment of the emergent surface (light adjusting surface) of the lens according to the present disclosure.

FIG. 6 is a schematic diagram of a second embodiment of the emergent surface (light adjusting surface) of the lens according to the present invention. At this time, the total internal reflection surface is an parabolic curved surface. In cases of parabolic curved surface, the incident light can be adjusted to be incident parallelly, and the parabolic curved surface reflects the incident light into light beams emerging through focus of the parabolic curved surface, wherein a focus F3 of the parabolic curved surface is just a sparkling point.

FIG. 5 and FIG. 6 merely show two situations, while in a third embodiment not shown, when the incident light is light between light of a point light source and parallel light, correspondingly, the total internal reflection surface is configured as a curved surface changing between the parabolic curved surface and the elliptic curved surface. Upon adjustment of the curved surface, it is finally realized that emergent light beams are also focused on positions of the focuses. The focuses are just sparkling points.

Figure 7:
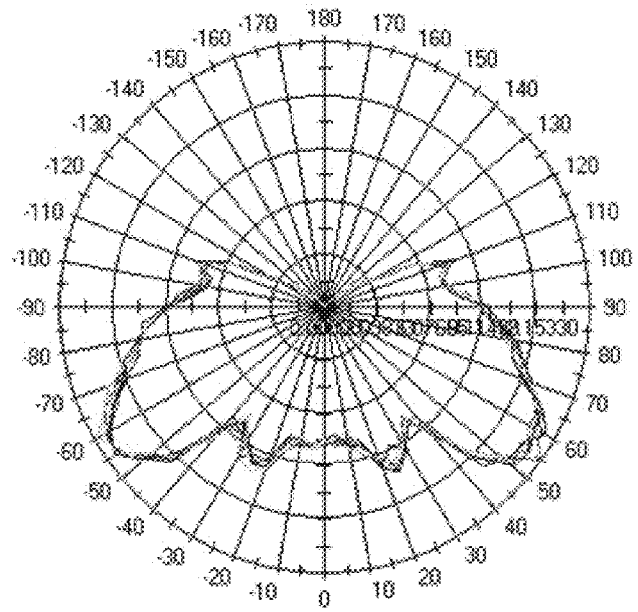
FIG. 7 is a curve of light intensity of the lens according to the present disclosure.

FIG. 7 is a curve of light intensity of the lens according to the present invention. It can be seen therefrom that most of the light distribution ranges from 40° to 90°, and meanwhile, the sparkling points can be seen, and illumination can be realized on the top and in lateral and downward directions.

Figure 8:
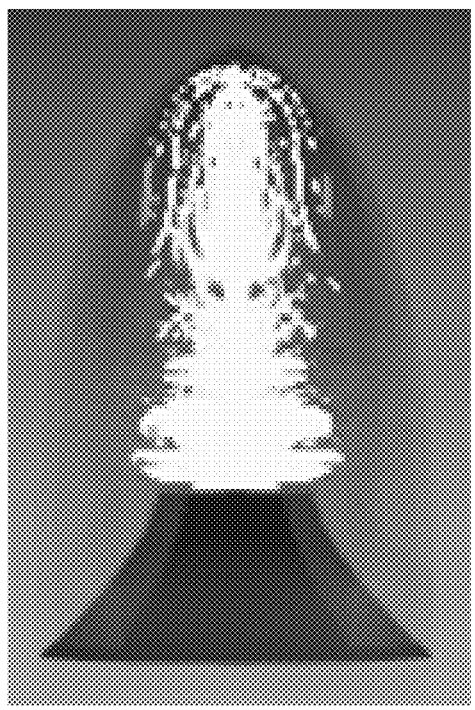
FIG. 8 is a schematic diagram of the lens according to the present disclosure after placed behind a B-type lamp housing.

FIG. 8 is a schematic diagram of the lens according to the present invention after placed behind a B-type lamp housing. After the lens is placed in the B-type lamp housing, light emitted from the light source resembles that of candle.

In addition, while a particular feature or aspect of an embodiment of the invention may have been disclosed with respect to only one of several implementations, such feature or aspect may be combined with one or more other features or aspects of the other implementations as may be desired and advantageous for any given or particular application.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lens for a lighting assembly, the lens comprising:
a bottom surface and
an outer surface extending upwardly from the bottom surface, wherein the bottom surface comprises an incident surface,
wherein the outer surface comprises at least one first surface unit that comprises a first surface and a second surface where the first surface and/or the second surface is configured as a light adjusting surface for receiving at least one part of light beams from the incident surface and adjusting the light beams from the incident surface to an emergent surface to emerge through the emergent surface, wherein all light beams emerging through the first surface are converged at a first focus, and all light beams emerging through the second surface are converged at a second focus.

2. The lens according to claim 1,
wherein the light adjusting surface adjusts light beams from the incident surface to light beams to be converged at the focus.

3. The lens according to claim 2,
wherein the light adjusting surface is a total internal reflection surface.

4. The lens according to claim 3,
wherein the total internal reflection surface is configured as a parabolic curved surface.

5. The lens according to claim 3,
wherein the total internal reflection surface is configured as an elliptic curved surface.

6. The lens according to claim 3,
wherein the total internal reflection surface is configured as a curved surface changing between a parabolic curved surface and an elliptic curved surface.

7. The lens according to claim 1,
wherein the first surface and the second surface are gathered together on top and form a ridge protrusion.

8. The lens according to claim 1,
wherein the first surface unit is in a number of at least two, and the first surface units are arranged rotation symmetrically in relation to a central line of the lens.

9. The lens according to claim 1, the emergent surface further comprises second surface units that receive a part of light beams from the incident surface and adjust the light beams into light beams emerging at least in lateral directions.

10. The lens according to claim 9,
wherein the second surface units further adjust the light beams into emergent light beams at least pointing downward.

11. The lens according to claim 10,
wherein the second surface units comprise a plurality of emergent surfaces arranged in sequence from top to bottom, and lateral light beams created by the emergent surfaces are reduced gradually from top to bottom, and downward light beams created are increased gradually.

12. The lens according to claim 11,
wherein respective emergent surface has a gradient gradually increasing from top to bottom in relation to a horizontal surface.

13. The lens according to claim 11,
wherein the second surface units form a plurality of convexes laterally protruding, each convex is defined by two surfaces, and at least one surface close to top of the two surfaces is used as the emergent surface.

14. The lens according to claim 11,
wherein the outer surface extends in a three-dimensional space ranging 0°-180°.

15. The lens according to claim 11,
wherein the first surface unit and the second surface units are configured to jointly create candle-shape emergent light beams.

16. The lens according to claim 1, wherein the incident surface is a hemispherical curved surface.

17. A lighting device comprising a lens,
the lens comprising:
a bottom surface, and
an outer surface extending upwardly from the bottom surface, wherein the bottom surface comprises an incident surface,
wherein the outer surface comprises at least one first surface unit that comprises a first surface and a second surface where the first surface and/or the second surface is configured as a light adjusting surface and for receiving at least one part of light beams from the incident surface and adjusting the light beams from the incident surface to an emergent surface to emerge through the emergent surface, wherein all light beams emerging through the first surface are converged at a first focus, and all light beams emerging through the second surface are converged at a second focus.

18. The lighting device according to claim 17, further comprising a circuit board and LED chips arranged on the circuit board, and the LED chips being arranged in center of a cavity defined by the incident surface.

* * * * *